United States Patent [19]
Kelley et al.

[11] Patent Number: 5,893,998
[45] Date of Patent: Apr. 13, 1999

[54] BOUNDARY APPARATUS FOR OPTICAL COMPONENT MOLDING

[75] Inventors: Matthew Olen Kelley; Han H. Nee; Michael Lee Mitchell; James Arthur Thorp, III, all of Terre Haute, Ind.

[73] Assignees: Sony Corporation, Tokyo, Japan; Digital Audio Disc Corporation, Terre Haute, Ind.

[21] Appl. No.: 08/804,017

[22] Filed: Feb. 21, 1997

[51] Int. Cl.$^6$ .................................................. B29C 45/73
[52] U.S. Cl. ....................... 249/111; 249/134; 249/135; 425/810; 264/327
[58] Field of Search .................................. 425/175, 552, 425/810, 812; 249/111, 117, 134, 135; 264/40.6, 116, 134, 327

[56] References Cited

U.S. PATENT DOCUMENTS

| | | | |
|---|---|---|---|
| 4,737,096 | 4/1988 | Poorten | 425/190 |
| 4,783,041 | 11/1988 | Sakaida et al. | 249/103 |
| 5,176,839 | 1/1993 | Kim . | |
| 5,297,951 | 3/1994 | Asai | 425/556 |
| 5,324,473 | 6/1994 | Baresich . | |
| 5,458,818 | 10/1995 | Kim et al. . | |
| 5,468,141 | 11/1995 | Iwami et al. | 425/542 |

*Primary Examiner*—James P. Mackey
*Attorney, Agent, or Firm*—Wood, Herron & Evans, L.L.P.

[57] ABSTRACT

A molding apparatus for molding an optical component comprises first and second mold sections (20–26, 34) forming opposite sides of a mold cavity (40). The mold cavity has a peripheral edge (43) contacting the optical component during the molding process which is made to reduce the transfer of heat through the peripheral edge (43). In one embodiment of the invention, the peripheral edge is made from a titanium alloy (56) having thermal conductivity approximately 50% of a thermal conductivity of stainless steel. In another embodiment of the invention, the peripheral edge of the mold is made from a porous titanium material (56a) having a density substantially less than the solid titanium alloy. In a further embodiment of the invention, the peripheral edge of the mold is made from a polyimide (70) having oxygen atoms implanted in its surface. In a still further embodiment of the invention, the peripheral edge of the mold is the stainless steel (84) normally used in the mold, however, an annular ring of a polyimide (82) is disposed behind the peripheral edge of the mold cavity. All of the above embodiments provide insulating properties at the peripheral edge (43) of the mold to reduce birefringence but maintain the wear resistance properties of a steel mold to provide long life.

19 Claims, 1 Drawing Sheet

BOUNDARY APPARATUS FOR OPTICAL COMPONENT MOLDING

FIELD OF THE INVENTION

This invention relates to molding components and more particularly, to an improved apparatus for molding optical components.

BACKGROUND OF THE INVENTION

Optical components, for example, optical discs, are generally produced by a molding process, for example, injection molding. The injection molding process utilizes a movable mold that is closed under high pressure against a stationary mold to form a mold cavity therebetween having a shape approximately equal to the shape of the desired molded product. In molding optical components, for example, audio compact discs or memory compact discs, a thermoplastic disc material, for example, a polycarbonate resin, is heated to a molten phase and injected into the mold cavity. The molten material is injected into the center of the mold cavity, and the molten material flows radially to the peripheral boundary of the mold cavity. The molds are generally made of a metal material, for example, a stainless steel, and have a high thermal conductivity, thereby facilitating the rapid cooling of the molten disc material. After the molded disc in the cavity has cooled to a solid phase, the movable mold is withdrawn to open the mold and permit the molded disc to be removed therefrom.

As with any production process, the above molding process is continuously reexamined and optimized to shorten the molding cycle time, thereby providing a greater number of molded parts per operating shift. However, attempts to shorten the molding cycle time, especially in the process of making optical components, often results in an unacceptable degradation of the optical characteristics of the molded component.

One measure of the optical quality of a molded optical component is birefringence. Birefringence is the characteristic of having two indices of refraction with different values causing separation of a light beam passing through the material into two diverging beams. An unpredictable separation of a light beam in a molded optical component, such as an optical disc or lens, can cause errors and inaccuracies in the process of reading data from or writing data to the disc or through the lens. Further, it has been found that birefringence is directly proportional to orientation stresses existing within the molded component. Thus, in the injection molding process, birefringence is directly proportional to both flow induced orientation stress and stress caused by rapid cooling through the glass transition temperature with a large temperature gradient.

The literature suggests methods for reducing birefringence in molding discs normally used for optical components. For example, one method suggests molding components with predetermined magnitudes of stress present in the discs after molding, and those stresses are then subsequently removed by a post molding process, for example, an annealing process. Other methods utilize different temperature profiles across the mold during the injecting and cooling periods. Still other methods utilize insulating mechanisms within the mold to control the heat transfer and cooling of the injected resin.

U.S. Pat. No. 5,458,818 discloses an insulating insert that is placed within the mold to reduce residual stress and orientation in the molding process, thereby producing more uniform birefringence. The insert may be a single layer of insulating film or may have an outer skin layer bonded to the insulating layer. Preferably, the outer skin layer has a metallic layer, for example, electroless nickel and an intermediate bonding layer comprised of a porous matrix of metal particles to facilitate bonding of the hard, metallic skin layer with the insulating material. The metallic outer skin has a different coefficient of expansion than the intermediate porous layer or the insulating layer. Consequently, the heating and cooling cycles experienced with each of the tens of thousands of expected molding machine cycles will create a tendency for the metallic outer skin to separate from the insulating layer. In addition, the nickel outer skin is substantially softer than the stainless steel of the mold. Therefore, while there may be an improvement in birefringence, a mold with the above insulating insert has a disadvantage; namely, it is less durable and will have a shorter life than a stainless steel mold.

U.S. Pat. No. 5,324,473 discloses the use of one or more nonmetallic, thermal flow control, insulator elements that form the mold cavity surfaces. The insulator elements preferably have a thermal conductivity, density, and specific heat that is substantially less than the same properties of tool steel from which the mold components are made. Such materials are selected from the group consisting of quartz glass, "PYREX" glass, sapphire, and polyimide thermoplastic. Insulator elements comprise opposed, generally circular mold cavity side surfaces in the opposed mold halves; and ring shaped insulator elements located around the peripheral edge of the mold cavity, thereby defining a cylindrical wall of the mold cavity. The materials chosen for the edge elements have lower mathematical products of thermal conductivity, specific heat, and density than the materials chosen for the side surface insulator elements. The side surface elements have greater surface areas per volume of resin from which to transfer heat than do the narrow edge regions. The edge insulator elements provide reduced heat flow at the cylindrical corners of the cavity to slow heat transfer from the edges. Therefore, the edges have a heat transfer rate that is similar to that of the walls, thus preventing the corners of the molded article from solidifying much before the side surfaces and the cylindrical wall.

While the above non-metallic insulating inserts improve the thermal characteristics and consistency of the molded part, thereby substantially reducing birefringence, the non-metallic inserts have two significant disadvantages. First, the nonmetallic inserts are softer than the steel molds and, do not have the strength and durability of the tool steel molds over tens of thousands of molding cycles. Therefore, the nonmetallic inserts have a shorter life than the steel molds and have the disadvantage of requiring more frequent replacement. Further, due to the general chemical similarity between the nonmetallic insulating inserts and the disc resin material being molded, the molded part may occasionally stick to the insulating insert after cooling, thereby making ejection of the molded part from the mold more difficult.

Due to differences in properties of insulative materials vis-a-vis the tool steel of traditional molds, trade-offs are encountered when insulators are used in the mold to reduce birefringence in the molded product. Insulators, while exhibiting lower thermal conductivity, specific heat and density than tool steel, which tend to reduce birefringence in the molded product, are generally softer than tool steel, causing greater wear, and hence require more frequent replacement, then molds made of only steel.

Consequently, there is a need for a mold system that improves on the disadvantages of the above described systems.

SUMMARY OF THE INVENTION

The present invention provides a mold system for molding an optical component that improves the quality, for example, reduces birefringence, of the molded optical disks, but also exhibits sufficient wear resistance to enable it to be used in production for extended periods without requiring cleaning, repair or replacement.

According to the principles of the present invention and in accordance with the preferred embodiments, a molding apparatus for molding an optical component comprises cooperating first and second mold members which define opposite sides of a mold cavity. The mold cavity has a peripheral edge contacting the optical component during the molding process. The peripheral edge is made to reduce the transfer of heat through the peripheral edge during the molding process. In one embodiment of the invention, the peripheral edge of the mold is made from a titanium alloy having a thermal conductivity approximately 50% of the thermal conductivity of the normally used stainless steel mold material. The titanium alloy reduces the heat transfer through the peripheral edge of the mold cavity during the molding process, thereby improving birefringence and hence, the optical quality of the molded part. Importantly, the titanium alloy has wear resistance properties comparable to stainless steel and therefore, has the advantage of lasting over thousands of molding cycles without requiring replacement.

In another embodiment of the invention, the peripheral edge of the mold is made from a porous titanium material, preferably produced by a powder metal process such that its density is substantially less than a solid titanium alloy. The lower density provides a substantial reduction in the heat transfer across the peripheral edge of the mold cavity with a substantial reduction in birefringence, yielding marked improvement in the optical quality of the molded product. While there is some reduction in the wear resistance of the peripheral edge of the mold of this invention, when compared to the steel typically used to fabricate molds, it still is durable and has a substantial life.

In a further embodiment of the invention, the peripheral edge of the mold is made from a polyimide having oxygen ions implanted in its surface. The polyimide provides substantial heat transfer control over the peripheral edge of the mold, and the peripheral edge surface with the oxygen implanted ions has a substantially greater density than a pure polyimide, thereby substantially improving the wear resistance of the peripheral edge of the mold.

In a still further embodiment of the invention, the peripheral edge of the mold is fabricated of stainless steel, that is, radially outwardly of the stainless steel mold cavity, however, an annular ring of a polyimide is disposed behind peripheral edge of the mold cavity. This embodiment combines the excellent wear resistance of stainless steel, thereby providing long life, with the excellent insulating properties of the polyimide to reduce the heat transfer through the peripheral edge of the mold cavity, thereby improving birefringence and the optical quality of the molded optical component.

In one aspect of the invention, the peripheral edge of the mold is formed by a cylindrical surface of an inner annular portion of a vent ring that is used with such molds to vent gas from the mold cavity during the molding process.

These and other objects and advantages of the present invention will become more readily apparent during the following detailed description taken in conjunction with the drawings herein.

DETAILED DESCRIPTION OF THE INVENTION

Figure 1:
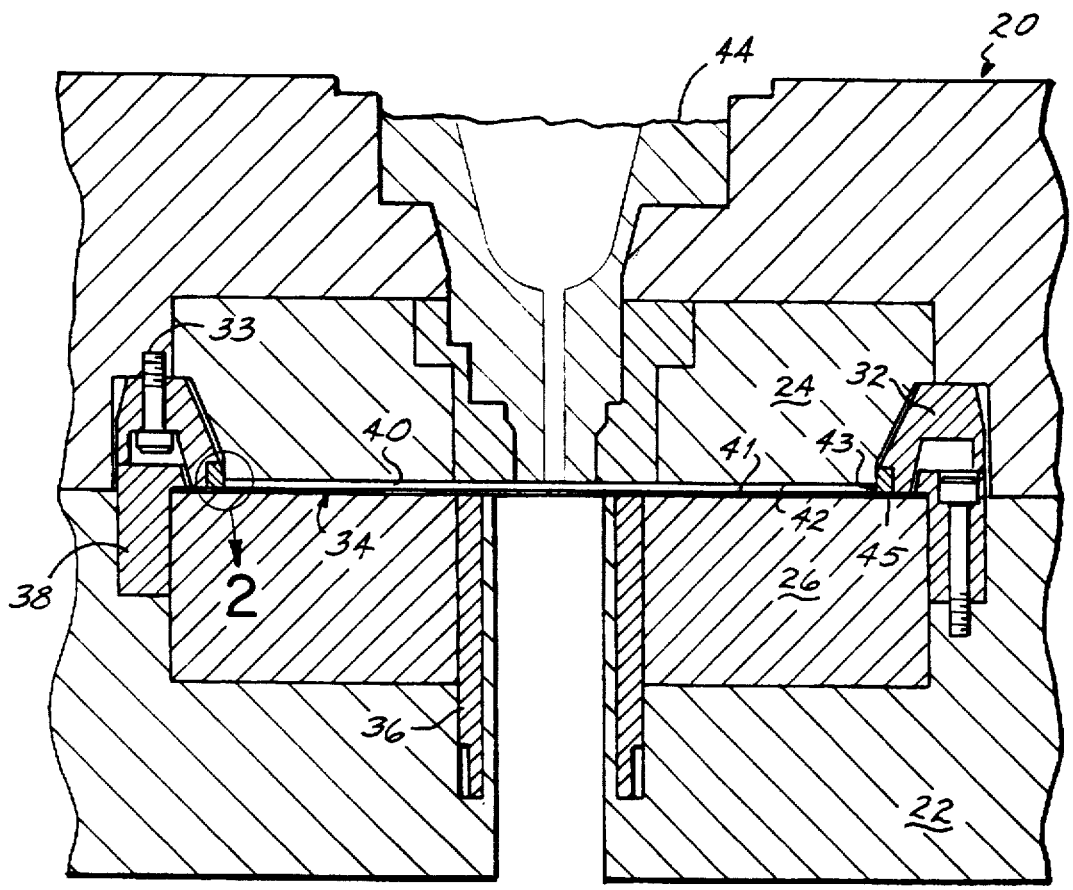
FIG. 1 is a partial cross-section view of a mold for a thin optical component, such as a disc, in accordance with the principles of the present invention.

FIG. 1 illustrates a portion of a molding apparatus that may be used to injection mold a plastic optical component, for example, a compact disc. A stationary mold section 20 is mounted to a stationary platen (not shown) of an injection molding machine (not shown), and a movable mold section 22 is mounted to a movable platen (not shown) of the injection molding machine. The movable mold is moved toward and away from the stationary mold by the machine in a known manner, to close and open the mold, respectively. A stationary mirror plate 24 is mounted within the stationary mold section 20 and a movable mirror plate 26 is similarly mounted in the moving mold 22. A vent ring 32 is mounted to the stationary mold section 20 by means of fasteners typically shown at 33. A stamping plate 34 is mounted on top of the movable mirror plate 26. The stamping plate 34 is held in position on the mirror plate 26 by an inner central clamp 36 and an outer peripheral clamp 38. When the moving mold section 22 is brought to its closed position with respect to the stationary mold section 20, as illustrated in FIG. 1, a mold cavity 40 is formed between the upper surface 41 of the stamping plate 34 and lower surface 42 of the stationary mirror plate 24. The mold cavity 40 has a shape that is substantially identical to the shape of the molded product, which in the preferred embodiment is a thin flat disc.

The compact disc molded product of FIG. 1 is created by a mold cavity 40 having opposed, generally circular, mold cavity surfaces, which as illustrated in FIG. 1, are the upper and lower mold cavity surfaces 41, 42, respectively. A generally cylindrical surface 43 forms the peripheral edge of the mold cavity 40. The generally cylindrical surface 43 is located on an inner, lower periphery of the vent ring 32. The generally circular, upper and lower surfaces 41, 42 of the mold cavity are normally provided by one of the opposed, inner mirror plate surfaces. Those mirror plate surfaces and the cylindrical surface 43 of the vent ring 32 must be made of a hard durable material that is chemically dissimilar to the thermoplastic resin being molded. Ideally, those surfaces must be such that the mold material does not stick or bond in any way to the surfaces, and further the surfaces must be durable and last over tens of thousands of molding cycles. Therefore, the mirror plates 24, 26 and the vent ring 32 are made from a hard metallic material, for example, a 420F stainless steel and are polished to a mirror-like finish.

The stamping plate 34 can be mounted to either of the mirror plates 24, 26, depending on the mold design, and the stamping plate 34 can, in a known manner, be held in place by either mechanical or vacuum clamps or a combination thereof. When the stamping plate 34 is mounted on the movable mirror plate 26 as shown in FIG. 1, an upper surface of the stamping plate 34 functions as the lower mold cavity surface 41. Surface 41 of the stamping plate 34, which is in contact with the molten resin must, to the extent possible, have the same properties as the inner surfaces 41 and 42 of the mirror plates 26 and 24, so that the stamping plate surface may be used over a large number of molding cycles.

In a known manner, an injection nozzle unit 44 engages a central portion of and extends through the stationary mold section 20 and stationary mirror plate 24. A molten thermoplastic material, for example, a molten polycarbonate, is injected under pressure centrally into the mold cavity 40; and it flows radially under pressured outwardly to the peripheral edge of the mold cavity formed by the cylindrical surface 43 of the vent ring 32. A small venting clearance or gap between a lower surface 45 of the vent ring and the opposing upper surface 41 of the stamping plate 34 permits gases to escape from the mold cavity as it fills with the molten polycarbonate.

As previously discussed, in order to provide a minimal and acceptable birefringence of the finished molded part, it is desirable to inhibit the rapid cooling or dissipation of heat from the peripheral edge of the mold cavity normally provided by the metal vent ring 32. Further, it is known to use a nonmetallic insulating insert on the peripheral edge of the mold cavity that is in direct contact with the molten material and operates to inhibit the transfer of heat therefrom. One difficulty with such nonmetallic inserts is that they are made of a material less hard than the other steel mold components and, therefore, are subject to wear and more frequent replacement. In addition, some inserts are generally chemically similar to the molded polycarbonate resin and, the molded parts have a tendency to stick to the nonmetallic inserts, thereby making removal of the molded part difficult.

Figure 2:
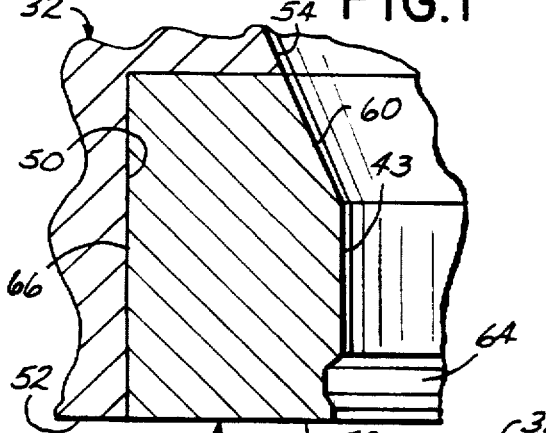
FIG. 2 is an enlarged cross-section view of the circled area 2 of FIG. 1, but with both the upper and lower mirror plates, not shown, and illustrates a first embodiment of the peripheral edge of the mold cavity in accordance with the principles of the present invention.

The present invention proposes several alternative embodiments of insulating rings that inhibits the transfer of heat from the peripheral edge of the mold cavity while at the same time providing a hard and wear resistant mold cavity surface. Referring to FIG. 2, an annular groove 50 is formed such that it intersects the lower surface 52 and the angular inner surface 54, such that the annular groove 50 is located on the lower, inner circumferential surface of the vent ring 32. An annular ring insert 56 is sized and shaped to fit within the annular groove 50 and has a bottom surface 58 contiguous and coextensive with the bottom surface 52 of the vent ring 32. The insert 56 is nonlaminated and further has an angled surface 60 contiguous and coextensive with the angle surface 54 of the vent ring 32. The inside, generally cylindrical surface 43 forming the peripheral edge of the mold cavity 40 extends generally perpendicular to the lower surface 58 and intersects the angled surface 60. An annular groove 64 is formed in a lower portion of the cylindrical surface 43 and provides a shape to the peripheral edge of the molded part.

The cylindrical surface 43 must have two important properties. First, the surface 43 must be made of a material having a thermal conductivity substantially less than the stainless steel vent ring 32. Second, the surface 43 must be hard and durable to stand up over long production runs, and preferably, the surface 43 should have mechanical properties comparable to the steel from which the mirror plates and vent ring are normally made. In this embodiment, the insert 56 is made from a titanium alloy, more specifically, a Ti 6Al-4V alloy, which provides a peripheral mold cavity surface 43 of comparable durability to the vent ring steel material. However, that titanium alloy has a thermal conductivity that is approximately one-half that of the stainless steel vent ring. Therefore, the titanium insert provides a mold having a wear resistance comparable to that of stainless steel but the lower thermal conductivity of the titanium insert 56 provides an approximately twenty (20%) percent reduction in molded disc birefringence over that obtained when a stainless steel vent ring is employed without the insert 56. The insert ring 56 has a cross-sectional thickness as measured radially from the surface 43 to an outer, cylindrical insert surface 66, of approximately 3 millimeters ("mm"); however, the cross-sectional thickness may range from approximately 0.5 mm to approximately 5 mm. The insert ring 56 is assembled in the annular groove 50 by providing a mechanical interference fit in a known manner.

Figure 2A:
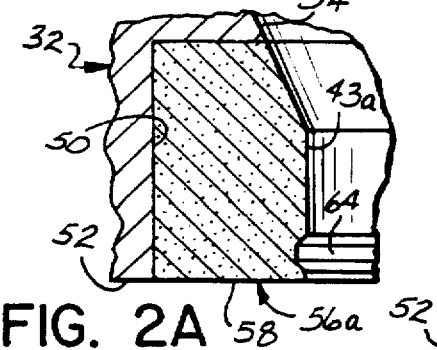
FIG. 2a is an enlarged cross-section view of the encircled area 2 of FIG. 1, but with both the upper and lower mirror plates, not shown, and illustrates another embodiment of the peripheral edge of the mold cavity in accordance with the principles of the present invention.

The above titanium insert provides a substantial reduction in the disc birefringence without compromising wear resistance. To further reduce birefringence, the titanium ring 56 may be manufactured to have a lower density, specific heat and thermal conductivity than the solid metal titanium ring 56 of FIG. 2. FIG. 2a illustrates an insert 56a made of Ti 6Al-4V alloy powder using a powder metallurgy process to provide a more porous titanium ring. Such processes for manufacturing components from metallic powders are well known and generally involve the steps of compacting the metal powder at both low and high temperatures and then providing subsequent heat treating and aging steps to produce the final powder metal part. The powder metal part is then machined or otherwise finished to its desired final dimensions, shape, and surface finish. The powder metallurgy process can be used to produce a porous titanium alloy insert ring 56a of FIG. 2a having a cylindrical surface 43a forming the peripheral edge of the mold cavity 40. Being more porous than the solid metal titanium ring 56 of FIG. 2, the titanium ring 56a has a density in the range of 25%–95% the density of the solid titanium insert 56. Preferably, the density of the titanium ring 56a is approximately 60%–75% of the solid titanium ring 56. Further, the specific heat and thermal conductivity of the powder metal titanium ring 56a is less than the solid titanium insert 56.

Figure 3:
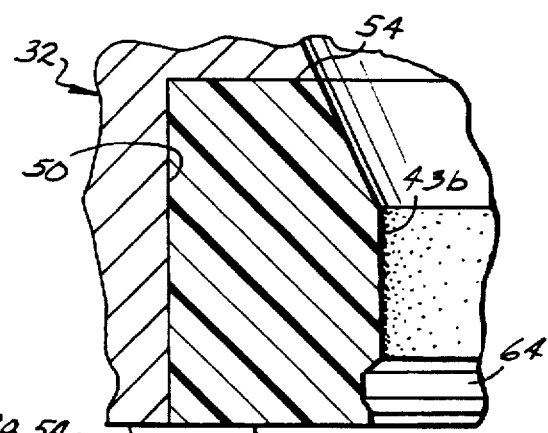
FIG. 3 is an enlarged cross-section view of the encircled area 2 of FIG. 1, but with both the upper and lower mirror plates, not shown, and illustrates a further embodiment of the peripheral edge of the mold cavity in accordance with the principles of the present invention.

While FIG. 2a illustrates an embodiment which reduces the thermal conductivity of a metallic component, another approach is to increase the surface density of a nonmetallic, polyimide material to provide a more wear resistant material that inherently has a relatively low thermal conductivity. Referring to FIG. 3, the vent ring 32 has a polyimide annular insert 70 disposed within the annular groove 50. The polyimide insert 70 is nonlaminated and has a size and shape that is substantially identical to the shape of the insert rings 56 of FIG. 2 and 56a of FIG. 2a. The insert ring 70 is a polyimide having oxygen ions embedded within its generally cylindrical surface 43b forming the peripheral edge of the mold cavity 40. The oxygen ions are implanted in the surface 43b using known ion implantation techniques in a dosage in the range of from approximately $5 \times 10^{10}$ $O_2$ ions/cm$^2$ to approximately $5 \times 10^{16}$ $O_2$ ions/cm$^2$. A dosage of $5 \times 10^{14}$ $O_2$ ions/cm$^2$ provides a substantially improved wear resistance over a polyimide insert not having the oxygen ion implantation. The annular insert 70 may be made of any polyimide. For example a "VESPEL" polyimide commercially available from Dupont Corporation of Wilmington, Del. While oxygen having an atomic number of eight is preferred, other elements may be selected for implantation, for example, any elements from the periodic table in the range of elements from Beryllium having an atomic number of 4 to gold having an atomic number of 79 may be used. An ion implantation process of the type described above is commercially available from UES Inc. of Dayton, Ohio.

Figure 4:
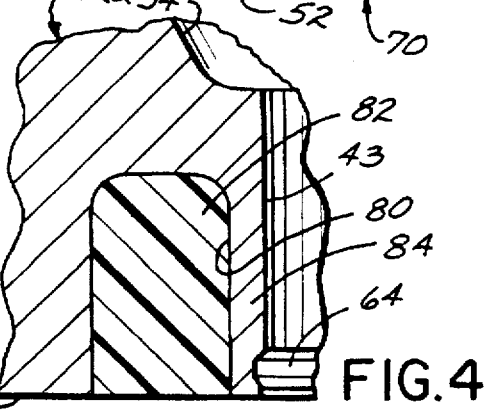
FIG. 4 is an enlarged cross-section view of the encircled area 2 of FIG. 1, but with both the upper and lower mirror plates, not shown, and illustrates a still further embodiment of the peripheral edge of the mold cavity in accordance with the principles of the present invention.

While the oxygen ion implanted polyimide ring 70 has a substantially improved wear resistance, its wear resistance is still less than that of the inserts 56, 56A of FIGS. 2 and 2A respectively. FIG. 4 illustrates a further embodiment of a vent ring 32 that provides the stainless steel cylindrical edge 43 having the high wear resistance a lower thermal conductivity. To improve the thermal conductivity, instead of using the annular groove 50, an annular groove 80 is cut into the lower surface 52 of the vent ring 32a. The slot 80 extends axially behind a substantial portion of the cylindrical surface 43, and the slot 80 has a cross-sectional radial thickness that is approximately the same as the radial thickness of the insert 56 of FIG. 2. A polyimide material 82 is disposed within the slot 80 to reduce the transference of heat through a thin wall portion 84 formed between the cylindrical surface 43 and the annular groove 80. Therefore, the thin wall 84 in combination with the polyimide material 82 together provides a high density surface 43 having a high wear resistance but with a thermal conductivity that is substantially lower than the surface 43a of the insert ring 56 illustrated in FIG. 2. The insert ring 82 may be made from any desired polyimide and is normally pressed into the annular groove 80 with an interference fit.

In use, a vent ring 32 may be manufactured using any one of the described embodiments to provide a peripheral edge of the mold cavity 40. During the molding process a molten resin is injected into the center of mold cavity 40 and flows radially toward the peripheral edge of the mold cavity formed by the inner annular surface 43 of the vent ring 32. Each of the described embodiments provides a mold portion behind the surface 43 having a thermal conductivity in the range of from approximately 25% to approximately 50% of the thermal conductivity of stainless steel and having a density in the range of from approximately 25% to approximately 95% of the density of stainless steel. Thus the rate of heat transfer through the cylindrical surface 43 of the mold cavity 40 is reduced and the flow induced orientation stress is similarly reduced. Consequently, the birefringence of the molded optical disc is reduced in the range of from approximately 15% to approximately 50% from an optical disc produced from a mold having its surface 43 made of stainless steel. Therefore, the invention has an advantage of providing an optical disc having substantially improved optical quality. In addition, each of the embodiments described in FIGS. 2–4 provides a peripheral edge 43 of the mold cavity 40 having a surface density and wear resistance comparable to a stainless steel surface. Thus, the embodiments described herein can be used over 10,000 or more machine cycles. Therefore, the embodiments described herein provide a further advantage; namely, a peripheral edge 43 of the mold cavity 40 that is highly durable and does not require frequent repair or replacement. In addition, the surfaces 43 of each of the embodiments of FIGS. 2–4 are chemically dissimilar from the polycarbonate resin being molded; and therefore, the molded disc does not stick to the surfaces 43 during the molding process, with the still further advantage of permitting the molded disc to be easily removed from the mold.

While the invention has been illustrated by the description of several embodiments and while the embodiments have been described in considerable detail there is no intention to restrict nor in any way limit the scope of the appended claims to such detail. Additional advantages and modifications will readily appear to those who are skilled in the art. For example in FIG. 1, only a single mold cavity 40 is illustrated; and further, a vent ring 32 having a particular shape is also illustrated. As will be appreciated the molds 20, 22 may contain any number of sets of mirror plates 24, 26, vent ring 32 and stamping plate 34 such that a plurality of molded parts is simultaneously produced. Further, the cross sectional shape of the vent ring 32 may vary with each mold design. The only components of the vent ring 32 that are common over various mold designs are the presence of surface 43 forming a peripheral edge of the mold cavity 40 and a venting area between one side 45 of the vent ring 32 and an opposing side 52 of the stamping plate 34. While the molds 20, 22 and associated mirror plates 24, 26 are illustrated in a generally vertical orientation in FIG. 1, as will be appreciated, that orientation may be rotated 90°, such that the movable mold section 22 moves in a horizontal direction with respect to the stationary mold section 20.

Therefore, the invention in its broadest aspects is not limited to the specific details shown and described. Consequently, departures may be made from the details described herein without departing from the spirit and scope of the claims which follow.

What is claimed is:

1. A molding apparatus for molding an optical component comprising:

a first mold section forming one side of a mold cavity;

a second mold section forming an opposite side of the mold cavity;

the mold cavity having a peripheral edge contacting the optical component during a molding process to reduce the transfer of heat through the peripheral edge of the mold cavity during the molding process, the peripheral edge being formed of a nonlaminated material having a thermal conductivity in the range of from approximately 35% to approximately 50% of the thermal conductivity of stainless steel and having a density in the range of from approximately 25% to approximately 95% of the density of stainless steel.

2. The molding apparatus of claim 1 wherein the peripheral edge of the mold cavity is made from a titanium material.

3. The molding apparatus of claim 2 wherein the titanium material is a Ti 6Al-4V alloy.

4. The molding apparatus of claim 2 wherein the titanium material is a porous titanium alloy having a density in the range of from approximately 25% to approximately 95% the density of a solid Ti 6Al-4V alloy.

5. The molding apparatus of claim 1 wherein the peripheral edge of the mold cavity is made from a polyimide having ions implanted therein to substantially increase the density of the polyimide.

6. The molding apparatus of claim 5 wherein the polyimide has oxygen ions implanted therein at a dosage in the range of from approximately $5\times10^{10}$ $O_2$ ions/cm$^2$ to approximately $5\times10^{16}$ $O_2$ ions/cm$^2$.

7. A molding apparatus for molding an optical component in a mold cavity comprising:

a first mold section forming one side of the mold cavity;

a second mold section forming an opposite side of the mold cavity;

a ring connected to one of the first and second mold sections for venting gas from the mold cavity, the ring being made from a metallic material and having
- an annular groove intersecting an inside peripheral surface of the ring, and
- an annular insert disposed in the annular groove, the annular insert having an inner surface forming a peripheral edge of the mold cavity and contacting the optical component during a molding process to reduce the transfer of heat through the peripheral edge of the mold cavity during the molding process.

8. The molding apparatus of claim 7 wherein the annular insert is made from a titanium material.

9. The molding apparatus of claim 8 wherein the titanium material is a Ti 6Al-4V alloy.

10. The molding apparatus of claim 9 wherein the titanium material is a porous titanium alloy having a density in the range of from approximately 25% to approximately 95% the density of a solid Ti 6Al-4V alloy.

11. The molding apparatus of claim 7 wherein the annular insert is made from a polyimide material having ions implanted on the inner surface to substantially increase the density of the polyimide on the inner surface.

12. The molding apparatus of claim 11 wherein the inner surface has oxygen ions implanted therein at a dosage in the range of from approximately $5 \times 10^{10}$ $O_2$ ions/cm$^2$ to approximately $5 \times 10^{16}$ $O_2$ ions/cm$^2$.

13. A molding apparatus for molding an optical component comprising:
- a stationary mold section forming one side of a mold cavity;
- a movable mold section forming an opposite side of the mold cavity;
- a ring connected to one of the stationary and movable mold sections, an inner, annular portion of the ring forming a peripheral edge of the mold cavity, the annular portion of the ring being made of a titanium material and contacting the optical component during a molding process to reduce the transfer of heat through the peripheral edge of the mold cavity during the molding process.

14. The molding apparatus of claim 13 wherein the annular portion of the ring is made from a titanium alloy.

15. The molding apparatus of claim 14 wherein the annular portion of the ring is made from a Ti 6Al-4V alloy.

16. The molding apparatus of claim 13 wherein the titanium material is a porous titanium alloy having a density in the range of from approximately 25% to approximately 95% the density of a solid Ti 6Al-4V alloy.

17. A molding apparatus for molding an optical component comprising:
- a stationary mold section forming one side of a mold cavity;
- a movable mold section forming an opposite side of two mold cavity;
- a ring connected to one of the stationary and movable mold sections, an inner annular portion of the ring forming a peripheral edge of the mold cavity, the annular portion of the ring being made of a polyimide material and having oxygen ions implanted therein, and the annular portion of the ring contacting the optical component during a molding process to reduce the transfer of heat through the peripheral edge of the mold cavity during the molding process.

18. The molding apparatus of claim 17 wherein the annular portion of the ring has oxygen ions implanted on a surface thereof at a dosage in the range of from approximately $5 \times 10^{10}$ $O_2$ ions/cm$^2$ to approximately $5 \times 10^{16}$ $O_2$ ions/cm$^2$.

19. The molding apparatus of claim 18 wherein the oxygen ion implantation dosage is approximately $5 \times 10^{14}$ $O_2$ ions/cm$^2$.

* * * * *